United States Patent [19]
Fujiwara et al.

[11] Patent Number: 5,575,869
[45] Date of Patent: Nov. 19, 1996

[54] METHOD OF PRODUCING VIBRATION INSULATOR

[75] Inventors: Takashi Fujiwara; Yosuke Iino, both of Chiba, Japan

[73] Assignee: Kinugawa Rubber Ind. Co., Ltd., Chiba, Japan

[21] Appl. No.: 218,521

[22] Filed: Mar. 28, 1994

[30] Foreign Application Priority Data

Mar. 29, 1993  [JP]  Japan .................... 5-068959

[51] Int. Cl.⁶ .................................................. B29C 65/04
[52] U.S. Cl. ................... 156/64; 156/274.8; 156/275.7; 156/294
[58] Field of Search ..................... 156/294, 272.2, 156/275.7, 379.6, 64, 274.4, 274.8, 359, 378; 403/225, 228; 267/140.3, 140.4, 141, 141.2, 141.3, 141.4, 141.5, 149, 153; 219/780

[56] References Cited

U.S. PATENT DOCUMENTS

| | | |
|---|---|---|
| 2,019,052 | 10/1935 | Lord . |
| 2,472,370 | 6/1949 | Drugmand ........................ 219/780 |
| 4,385,025 | 5/1983 | Salerno et al. . |
| 4,950,347 | 8/1990 | Futagawa et al. ................ 156/293 |
| 5,277,737 | 1/1994 | Li et al. ......................... 156/274.8 |

FOREIGN PATENT DOCUMENTS

| | | |
|---|---|---|
| 492789A | 7/1992 | European Pat. Off. . |
| 2442991 | 6/1980 | France . |
| 2679485 | 1/1993 | France . |
| 221434 | 9/1991 | Japan . |
| 162207 | 6/1993 | Japan ........................... 156/272.2 |
| 2038446 | 7/1980 | United Kingdom . |

OTHER PUBLICATIONS

Abstract of FR 2679485.
Readdy, "Plastics Fabrication by Ultraviolet, Infrared, Induction, Dielectric and Microwave Radiation Methods", Apr. 1972, pp. 51–61.
Patent Abstracts of Japan, vol. 14, No. 228 (M–973) [4171] for Manufacture of Vibration Preventive Bushing.

*Primary Examiner*—Steven D. Maki
*Attorney, Agent, or Firm*—Bachman & LaPointe, P.C.

[57] ABSTRACT

For producing a vibration insulator for use in a motor vehicle or the like, a unique method is described which comprises (a) producing an inner unit which includes an inner cylindrical member of metal and a compounded rubber block disposed about the inner cylindrical member; (b) applying an adhesive to an inner surface of an outer cylindrical member of FRP, the adhesive being of a type which is cured and hardened when heated; (c) press-fitting the inner unit in the outer cylindrical member; (d) putting an electrode plate around the outer cylindrical member near the inner unit; and (e) applying a high frequency current to the electrode plate to induce a high frequency dielectric heating by which the adhesive and the compounded rubber block are heated, the high frequency current having a frequency lower than 100 MHz.

6 Claims, 6 Drawing Sheets

(E-5)

H.F.C. APPLICATION TIME (SEC.)

(R-5)

METHOD OF PRODUCING VIBRATION INSULATOR

BACKGROUND OF THE INVENTION

1. Field of the Invention

The present invention relates in general to a method of producing vibration insulators, and more particularly, to a method of producing vibration insulators used in motor vehicles or the like. More specifically, the present invention is concerned with a method of producing the vibration insulators of a type which comprises an outer cylindrical member of fiber-reinforced plastic, an inner cylindrical member of metal received in the outer cylindrical member, and a compounded rubber block interposed therebetween.

2. Description of the Prior Art

Hitherto, various types of vibration insulators have been proposed and put into practical use particularly in the field of motor vehicles. One of them is of a type which comprises an outer cylindrical member of fiber-reinforced plastic, an inner cylindrical member of metal received in the outer cylindrical member and a compounded rubber block interposed therebetween. For production of the vibration insulators of such type, two methods have been commonly used.

One method is as follows.

First, an adhesive is applied to both an inner surface of the outer cylindrical member and an outer surface of the inner cylindrical member. The adhesive is of a type which becomes activated when heated to a certain level. Then, the inner cylindrical member is coaxially received in the outer cylindrical member and they are put into a mold which has been heated to about 150° C. to 170° C. Then, a liquid state (or insufficiently vulcanized) rubber material is poured into the mold and thus into a cylindrical clearance defined between the inner and outer cylindrical members. For sufficiently curing the rubber material, the temperature of the mold is kept at 150° C. to 170° C. for a certain time. Thus, in this method, curing of the adhesive and that of the rubber material are achieved at the same time. In other words, the bonding between the outer cylindrical member and the compounded rubber block and that between the inner cylindrical member and the rubber block are achieved at the same time. For ease of understanding, this method will be named as "one-step bonding method".

The other method, which will be named as "two-step bonding method", is as follows.

First, an inner unit is produced by forming a compounded rubber block around the outer surface of the inner cylindrical member using the above-mentioned one step bonding method. That is, by this first step, the bonding between the rubber block thus formed and the inner cylindrical member is achieved. Then, the inner unit thus produced is press-fitted in the outer cylindrical member whose inner surface has been applied with an adhesive, and then, the entire structure is heated to a certain temperature to cure the adhesive. Thus, by this second step, the bonding between the compounded rubber block and the outer cylindrical member is achieved. For heating the entire structure, one method is proposed by Japanese Patent First Provisional Publication 3-221434. That is, in this method, powder of ferroelectric material, ferromagnetic material or electrically conductive material is dispersed in the adhesive, and the adhesive is heated by means of a high frequency heating.

However, due to their nature, the above-mentioned two conventional methods have drawbacks which are as follows.

That is, in the one-step bonding method, the mold is kept heated within the range from 150° C. to 170° C. for curing or vulcanizing the rubber material. However, such temperature range affects the mechanical strength of the plastic (viz., FRP) which constitutes the outer cylindrical member. In fact, the strength of the plastic at such high temperature becomes very low. Accordingly, there arises a possibility that the outer cylindrical member heated to such high degree is deformed and/or cracked due to a marked pressure produced by the rubber material poured into and cured in the mold. Furthermore, if the outer and inner cylindrical members are different in length, the length of the mold must be matched with the longer one. This however induces an ill-matched increase in weight of the mold.

In the two-step bonding method, the inner unit is press-fitted in the outer cylindrical member applying a marked stress to the outer cylindrical member. The press-fitting however affects the heat resistance of the outer cylindrical member constructed of FRP. That is, due to a marked stress applied to the outer cylindrical member, the heat resistance of the same is lowered to the level of 100° C. to 120° C. which is very low as compared with the activation temperature (viz., 130° C. to 200° C.) of the adhesive. Of course, the temperature suitable for the outer cylindrical member and the temperature suitable for the adhesive are not obtained by means of a simple heating method. If such simple heating method is actually used, deformation and/or poor bonding of the outer cylindrical member tends to occur. This drawback may be solved by using the method disclosed by the above-mentioned Japanese Patent Publication 3-221434. However, in this method, a new problem arises in that the powder (viz., powder of ferroelectric material, ferromagnetic material or electrically conductive material) dispersed in the adhesive has a bad influence on the essential work (viz., bonding) of the adhesive. Furthermore, when the amount of the powder in the adhesive increases, it becomes necessary to make a frequent stirring of the adhesive before and during application of the powder-mixed adhesive to the outer cylindrical member.

It is said that when a compounded rubber is mainly composed of polar rubbers whose basic polymer or polymers have SP value (viz., solubility parameter) larger than 8.6, a partial heating of the rubber is possible by means of the high frequency heating. Thus, in this case, activation of an adhesive contacting the heated part of the rubber may be expected. However, in general, the compounded rubbers having such polar rubbers fail to have a satisfied vibration insulation ability. Furthermore, since such rubbers are relatively expensive, the vibration insulators including them would have a poor competitive position in markets even though the bonding by the adhesive is made well.

SUMMARY OF THE INVENTION

It is therefore an object of the present invention to provide a method of producing a vibration insulator, which is free of the above-mentioned drawbacks.

According to the present invention, there is provided a method of producing a vibration insulator. The insulator comprises an outer cylindrical member of fiber-reinforced plastic, an inner cylindrical member of metal received in the outer cylindrical member in a manner to define a cylindrical space therebetween, and a compounded rubber block intimately disposed in the cylindrical space. The method comprises the steps of: (a) producing an inner unit which includes the inner cylindrical member and the compounded rubber block which is disposed about the inner cylindrical member; (b) applying an adhesive to an inner surface of the outer cylindrical member, the adhesive being of a type which is cured and hardened when heated; (c) press-fitting the inner unit in the outer cylindrical member; (d) putting an electrode plate around the outer cylindrical member near the inner unit; and (e) applying a high frequency current to the electrode plate to induce a high frequency dielectric heating by which the adhesive and the compounded rubber block are heated, the high frequency current having a frequency lower than 100 MHz.

BRIEF DESCRIPTION OF THE DRAWINGS

Other objects and advantages of the present invention will become apparent from the following description when taken in conjunction with the accompanying drawings, in which.

THEORIES ON WHICH THE INVENTION IS BASED

Figure 1:
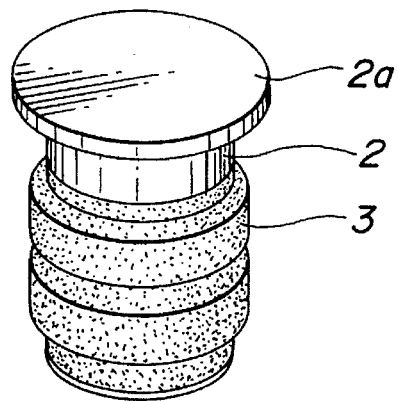
FIG. 1 is a perspective view of one inner unit of a vibration insulator, which unit is produced by means of a first step employed in the method of the present invention.

The dielectric loss of a compounded rubber block is very small as compared with that of common plastics. Accordingly, when, in high frequency dielectric heating, adequate heating of the compounded rubber block is intended by using an AC current whose frequency is lower than 100 MHz, it is necessary to greatly increase the electric field strength at the rubber. The demand for increasing the electric field strength is much severe in nonpolar rubber blocks whose SP value (viz., Solubility Parameter) is very small.

Hitherto, heating by using such low frequency current has not been practically used. In fact, heating of the nonpolar rubber block has been made by using a microwave. However, as is known, the microwave belongs to a troublesome electromagnetic wave which should be handled with care due to its very high permeability. While, as is known, a high frequency current having a frequency lower than 100 MHz is harmless.

It is known in the art that if the bridge structures in a compounded rubber block increase in number due to addition of various vulcanizing agents, cross linking agents and the like to the rubber material, the dielectric loss of the rubber block is increased. In fact, the dielectric loss of such rubber block is remarkably high as compared with that of a fiber-reinforced plastic (viz., FRP), such as fiber-reinforced epoxy resin. Accordingly, if a high frequency dielectric heating is practically applied to a combined unit which comprises such rubber block and the FRP, high heating would take place in the rubber block at first. Furthermore, considering a fact that the electric field strength decreases with increase of distance from an electrode to which the high frequency current is applied, it is readily understood that a certain temperature gradient appears in the rubber block.

Thus, if a given portion of a compounded rubber block, which is to be in contact with the FRP, is applied with a non-cured adhesive and if the given portion is positioned near the electrode under the high frequency dielectric heating operation, it is expected that the given portion is heated first and thus the adhesive is sufficiently cured resulting in that a desired bonding between the rubber block and the FRP is achieved. Furthermore, if the high frequency dielectric heating is so controlled that the temperature at the given portion is within a range from the activation temperature of the adhesive to the decomposition temperature of the rubber block, it is expected that the bonding between the rubber block and the FRP is assuredly made without causing a substantial deterioration of the rubber block. Usage of an adhesive having no extra material (such as powder of ferroelectric material, ferromagnetic material and/or electrically conductive material, as described in Japanese Patent Publication 3-221434) added thereto should exhibit its essential work (viz., bonding function).

The present invention is provided by embodying the above-mentioned theories.

DETAILED DESCRIPTION OF THE INVENTION

In the following, the present invention will be described in detail with reference to the drawings.

In order to complete the present invention, the inventors produced eight types of vibration insulators as test pieces and carried out various examinations and tests on them.

As is seen from Table-1 (see page 17), the eight types were Example-1, Example-2, Example-3, Example-4, Reference-1, Reference-2, Reference-3 and Reference-4.

The parts for each type vibration insulator were an outer cylindrical member 1, two inner cylindrical members 2, two compounded rubber blocks 3 and an adhesive 4 of chloric system.

Each vibration insulator E-1, E-2, E-3, E-4, R-1, R-2, R-3 or R-4 was produced in the following manner.

The outer cylindrical member 1 was constructed of an epoxy resin of bisphenol-A type and contained therein about 60% by volume of carbon fiber of pitch type. The epoxy resin was cured at 100° C. for 3 hours. The outer diameter, inner diameter and length of the outer cylindrical member 1 were 82.6 mm, 76.6 mm and 200 mm respectively. The cylindrical wall of the outer cylindrical member 1 had thus a thickness of 3 mm therethroughout.

Each inner cylindrical member 2 was constructed of metal of STKM12B (JIS, Japanese Industrial Standard). The outer diameter, inner diameter and length of the inner cylindrical member 2 were 68.9 mm, 64.3 mm and 200 mm respectively. As is seen from FIG. 1, each inner cylindrical member 2 had a metal disc 2a of SS41 (JIS) welded to one end thereof. The diameter and thickness of the metal disc 2a were 130 mm and 15 mm respectively.

The compounding agents of the rubber blocks 3 for each vibration insulator are shown in Table-1.

Before being applied with the rubber blocks 3, the outer and inner cylindrical members 1 and 2 were applied at their inner and outer cylindrical surfaces with a primer of chloric system and, after drying the primer, with an adhesive 4. The outer and inner cylindrical members 1 and 2 were then left in a curing oven and heated at 80° C. to 100° C. for a certain time. With this, solvent of the adhesive 4 was removed and the adhesive 4 was cured or hardened to a certain degree. It is to be noted that the activation temperature Ta of the adhesive 4 of chloric system was about 160° C. to 170° C.

Following this, a first bonding step was carried out for all the vibration insulators E-1, E-2, E-3, E-4, R-1, R-2, R-3 and R-4, which was as follows.

Figure 2:
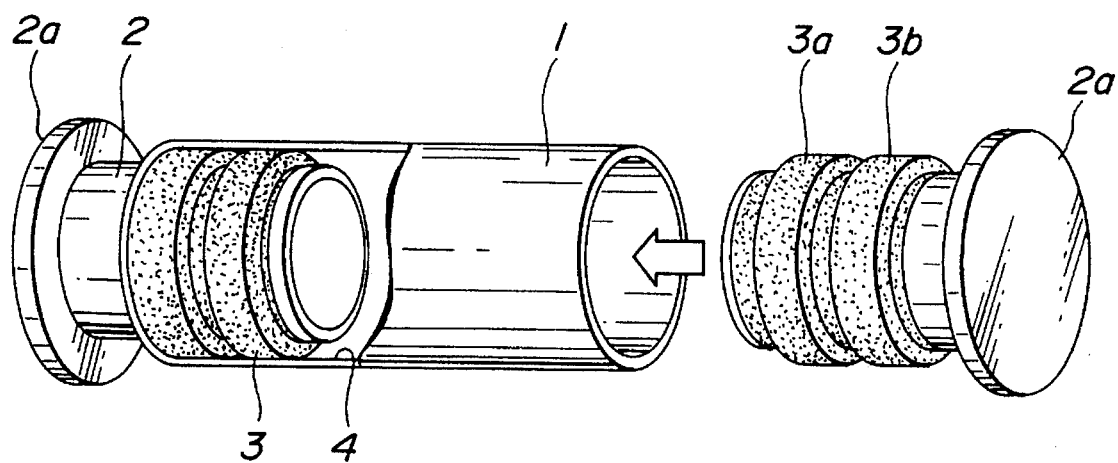
FIG. 2 is a partially cut perspective view of the vibration insulator with one inner unit which is already press-fitted in one end of an outer cylindrical member and the other inner unit which is about to be press-fitted in the other end of the outer cylindrical member.

A mold heated to about 150° C. was prepared. The inner cylindrical member 2 was put in the mold, and a liquid state (or insufficiently vulcanized) rubber material for the rubber block 3 was poured into the mold and compressed for about 10 minutes. By using this method, two inner units as shown in FIGS. 1 and 2 were produced, each including a sufficiently cured cylindrical rubber block 3 mounted on and bonded to the inner cylindrical member 2. The cylindrical rubber block 3 was shaped to have two identical ring-shaped portions 3a and 3b each being 20 mm in width and 5.2 mm in thickness.

Then, as is seen from FIG. 2, the two inner units were press-fitted in both ends of the outer cylindrical member 1. Under this compressed condition, the thickness of each ring-shaped portion 3a or 3b of the cylindrical rubber blocks 3 was about 4 mm. That is, the ring-shaped portion 3a or 3b was compressed by about 1.2 mm or by about 23%.

Following this, a second bonding step was carried out for only the vibration insulators E-1, E-2, E-3 and E-4, which was as follows.

Figure 3:
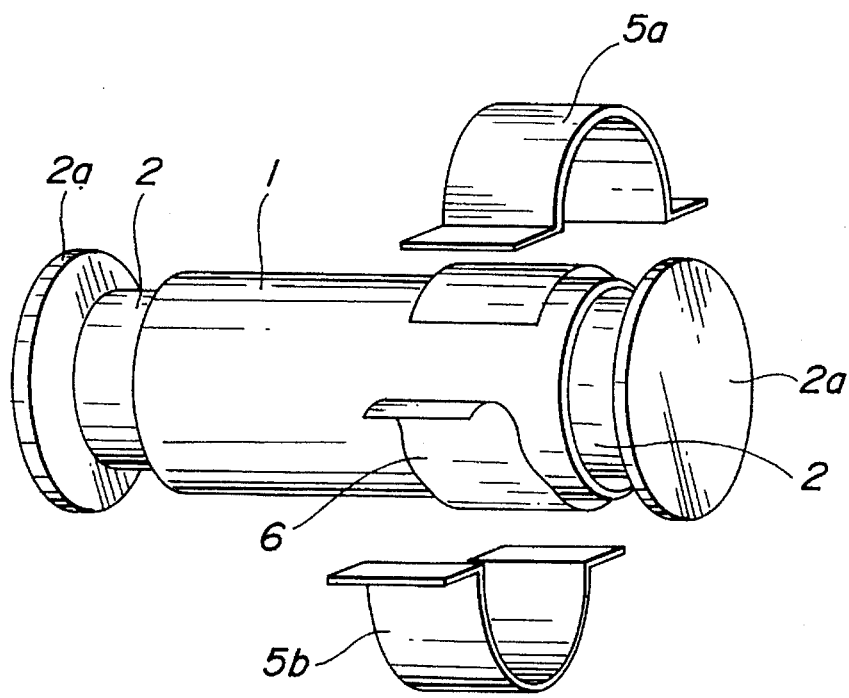
FIG. 3 is a perspective view of the semi-finish vibration insulator with some elements of high frequency dielectric heating device incorporated therewith.

As is seen from FIG. 3, a sheet 6 of Teflon (Trade Name: Polytetrafuluoroethylene) of 70 mm in width and 0.2 mm in thickness) was put around one end of the outer cylindrical member 1 and two semicircular brass plates 5a and 5b were put around the end of the outer cylindrical member 1 with the Teflon sheet 6 intimately interposed between. Each semicircular brass plate 5a or 5b was 70 mm in width and 1 mm in thickness. These brass plates 5a and 5b were combined to constitute a circular electrode 5. For this combination, each brass plate 5a or 5b was formed with bent flange portions.

Figure 4:
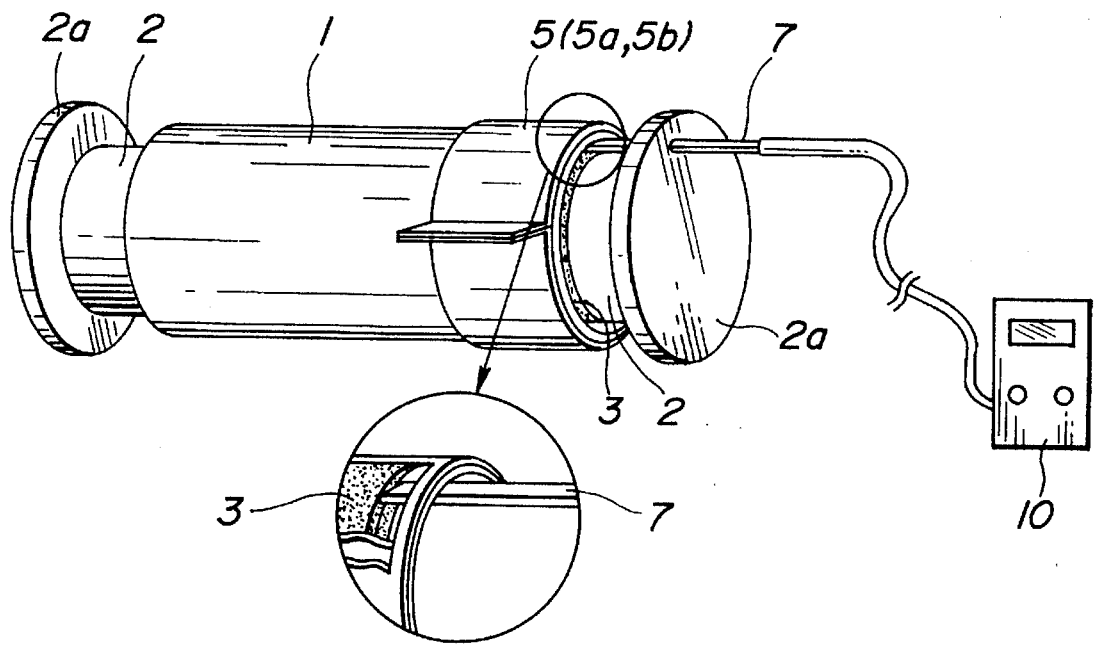
FIG. 4 is a sketch showing the method of measuring the temperature of a compounded rubber block during the high frequency dielectric heating.

As is seen from FIG. 4, in order to measure the temperature of the rubber block 3 during a subsequent high frequency dielectric heating, a temperature sensor 7 was set in the rubber block 3 of one inner unit. The sensor 7 was connected to a temperature meter 10. The sensor 7 was of an infrared radiation sensing type which was not affected by high frequency noises.

Figure 5:
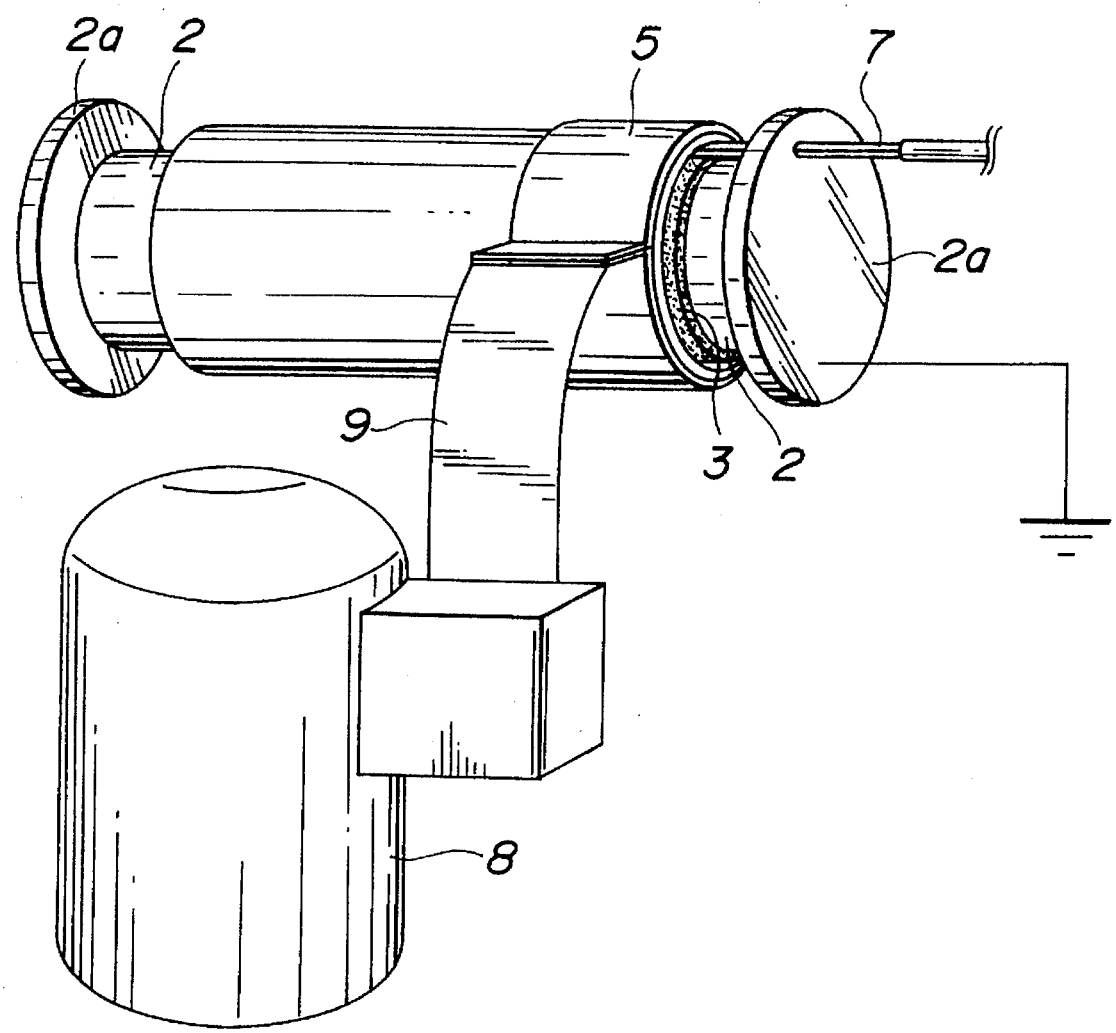
FIG. 5 is a sketch showing the method of heating the semi-finish vibration insulator by means of the high frequency dielectric heating device.

As is seen from FIG. 5, for the high frequency dielectric heating, the circular electrode 5 (viz., 5a and 5b) was connected through a copper plate 9 to a high frequency oscillator 8 which used a triode bulb for effecting 3 KW output. For the heating, 40 MHz and 0.5 A high frequency current was applied to the circular electrode 5. With this, the rubber block 3 was bonded to the inner surface of the outer cylindrical member 1. During the heating, the temperature of the adhesive 4 was monitored by the temperature meter 10. When now the temperature of the adhesive 4 was found to reach a level from 160° C. to 170° C., the high frequency dielectric heating was stopped and instantly the electrode 5 and the Teflon sheet 6 were dismantled from the outer cylindrical member 1 and the temperature of the outer cylindrical member 1 was measured.

It is to be noted that, by using a similar method, the other inner unit was bonded to the other end of the outer cylindrical member 1.

It is also to be noted that the above-mentioned second bonding step was not applied to the reference vibration insulators R-1, R-2, R-3 and R-4. That is, in these reference insulators R-1, R-2, R-3 and R-4, the two inner units were press-fitted in and bonded to the outer cylindrical member 1 with only the adhesive intimately interposed therebetween.

The performances of the eight vibration insulators E-1, E-2, E-3, E-4, R-1, R-2, R-3 and R-4 were tested in the following manner.

That is, each vibration insulator E-1, E-2, E-3, E-4, R-1, R-2, R-3 or R-4 was left in an open air until the outer cylindrical member 1 was cooled to a room temperature. Then, visual inspection test was made to the insulators E-1, E-2, E-3 and E-4. Then, all vibration insulators were subjected to a twisting test. This twisting test was carried out twice for each insulator E-1, E-2, E-3, E-4, R-1, R-2, R-3 or R-4. That is, at first, one metal disc 2a and the outer cylindrical member 1 were grasped by respective chucks of a twisting tester and forced to twist in opposite directions at a speed of 5 deg/min. With this, the maximum torque exhibited by the insulator was measured. The same test was applied to the bonding made between the other inner unit and the outer cylindrical member 1. The two data of the maximum torque were averaged to provide a mean value which is shown in Table-1.

As will be understood when comparing the data between E-1 and R-1, between E-2 and R-2, between E-3 and R-3 and E-4 and R-4, the maximum torque exhibited by the examples E-1, E-2, E-3 and E-4 according to the present invention was much greater than that of the references R-1, R-2, R-3 and R-4. This data showed that due to the work of the high frequency dielectric heating, there was evidently produced chemical bonding between the rubber block 3 and the outer cylindrical member (FRP) 1. It was revealed that the high frequency dielectric heating had no bad influence on the external appearance of the Examples E-1, E-2, E-3 and E-4. In the examples E-1, E-2, E-3 and E-4, within only 25 seconds from starting the high frequency dielectric heating, the temperature of the adhesive reached to the activation level (viz., 160° C. to 170° C.) of the adhesive. That is, the adequate heating of the adhesive could be made within such a very short time, which induces a high productivity of the vibration insulator. At the time when the temperature of the adhesive reached to its activation level, the outer cylindrical members (FRP) 1 showed their temperature within a range from 70° C. to 75° C. Of course, at such lower temperature, the outer cylindrical members 1 constructed of the above-mentioned FRP were not softened and/or deteriorated. As is seen from the graph of FIG. 6, when the heating was stopped, the temperature of the rubber block 3 was instantly lowered to a level below 100° C. This was because of heat transmission from the rubber block 3 to the outer and inner cylindrical members 1 and 2 which had a lower temperature.

Figure 6:
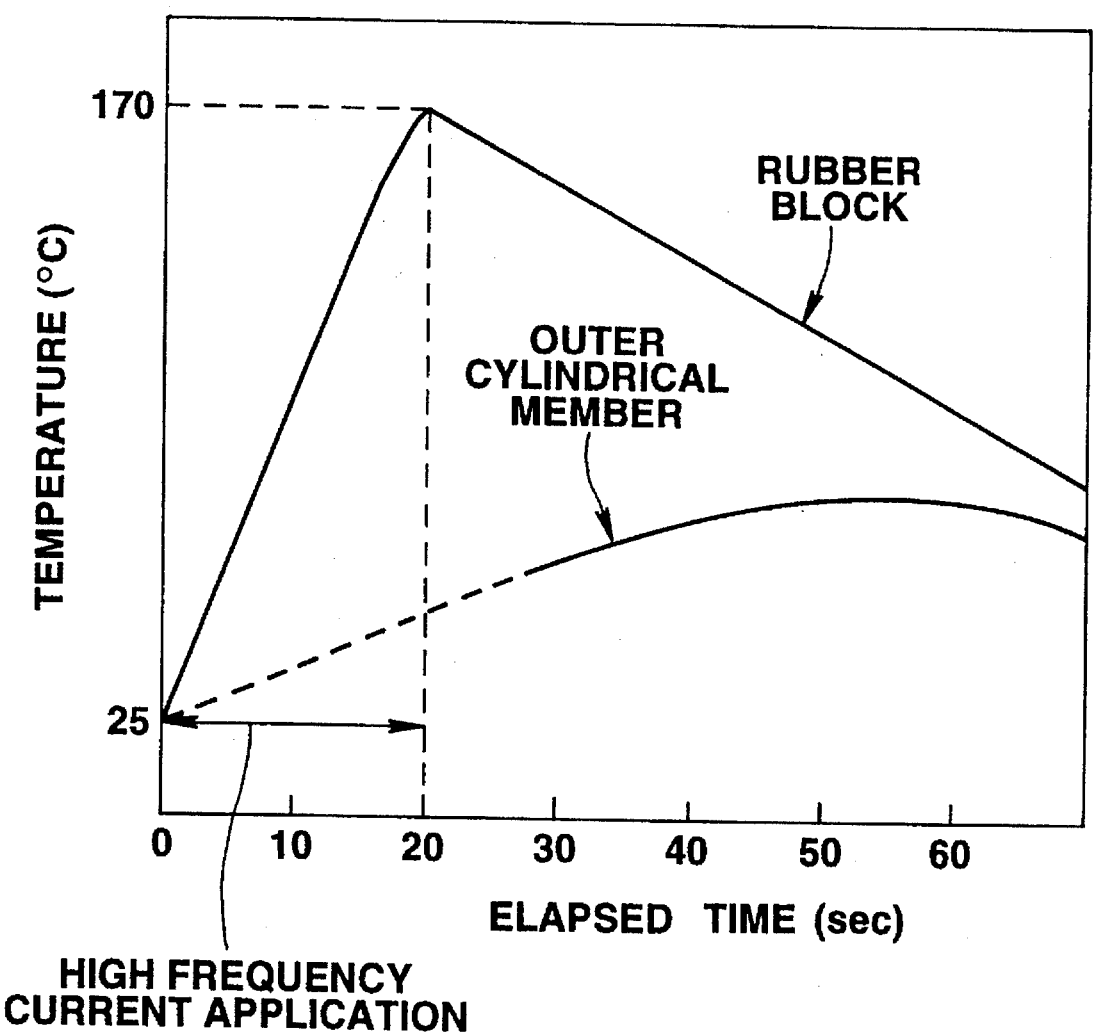
FIG. 6 is a graph showing temperature changes appearing in different portions of one example (viz., vibration insulator) produced by the method of the present invention.

It is to be noted that shown by a broken line in FIG. 6 is an estimated temperature of the outer cylindrical member 1. This was because the actual temperature measurement of the outer cylindrical member 1 had to be made after the electrode 5 was removed from the outer cylindrical member 1.

The rubber blocks 3 used in the examples E-1, E-2, E-3 and E-4 and those used in the references R-1, R-2, R-3 and R-4 were of a nonpolar type having the SP value lower than 8.6. However, as is understood from Table-1, all the examples E-1, E-2, E-3 and E-4 showed a satisfied bonding between the rubber block 3 and the outer cylindrical member 1.

If desired, the Teflon sheet 6 may be replaced with other electrically insulating materials, such as ceramics, paper and the like.

EXAMINATIONS FOR SUPPORTING THE THEORIES

In order to support the theories on which the present invention is based, the inventors carried out an examination on an example test piece (E-5), which is as follows.

Figure 7:
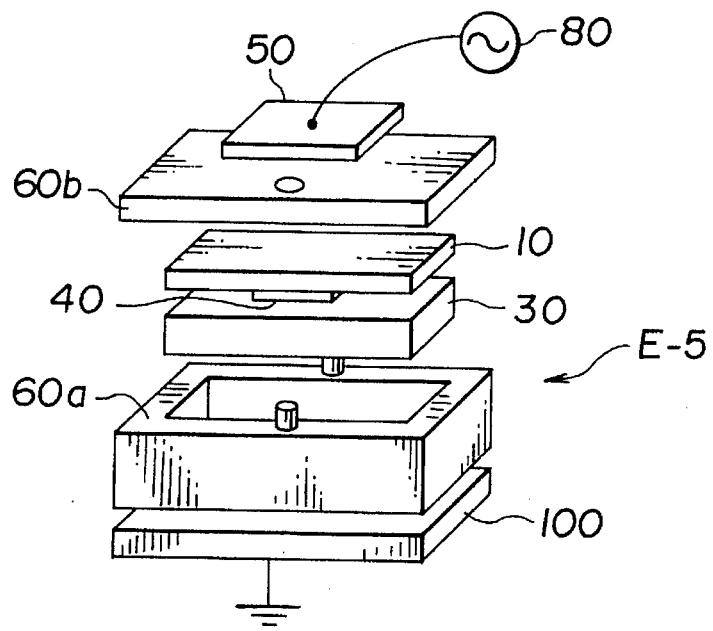
FIG. 7 is a sketch showing in an exploded manner an example test piece incorporated with a high frequency dielectric heating device.

First, as is seen from FIG. 7, a rectangular compounded rubber block 30 was produced. The composition of the rubber block is shown in Table-2.

TABLE 2

| | |
|---|---|
| NR | 65 |
| BR | 35 |
| Zinc Oxide | 5 |
| Stearic Acid | 1 |
| Antioxidant | 4 |
| Carbon Black | 40 |
| Oil | 20 |
| Sulfur | 1.5 |
| Vulcanization Accelerator | 0.6 |
| | (parts by weight) |

A rectangular fiber-reinforced plastic block 10 was prepared, which comprised epoxy resin as a base and carbon fiber as a reinforcing member. An adhesive 40 of chloric system was prepared and a high frequency oscillator 80 capable of outputting a high frequency current of 40.6 MHz was prepared.

The thickness of the fiber-reinforced plastic block 10 was 2.2 mm and that of the rubber block 30 was 5.7 mm. The adhesive 40 was applied to a given rectangular area of a lower surface of the fiber-reinforced plastic block 10, which area was 25.4 mm×25.4 mm. The two blocks 10 and 30 were put together and put in a rectangular case 60a constructed of Teflon. A Teflon cover 60b of 3.0 mm in thickness was put on the rectangular case 60a to press the two blocks 10 and 30 uniformly therethroughout. A rectangular electrode 50 was put on the Teflon cover 60b and a rectangular metal plate 100 was attached to the bottom of the rectangular case 60a. Thus, the distance from the electrode 50 to the outer surface of the fiber-reinforced plastic block 10 was 3.0 mm and that from the electrode 50 to the outer surface of the rubber block 30 was 5.2 mm. The electrode 50 was connected to the high frequency oscillator 80 and the rectangular metal plate 100 was grounded. The oscillator 80 was then energized to apply a high frequency current to the electrode 50. During the current application, the temperature of the fiber-reinforced plastic block 10, the adhesive 40 and the rubber block 30 was measured by a temperature sensor. The sensor was of a type not affected by the high frequency.

Figure 8:
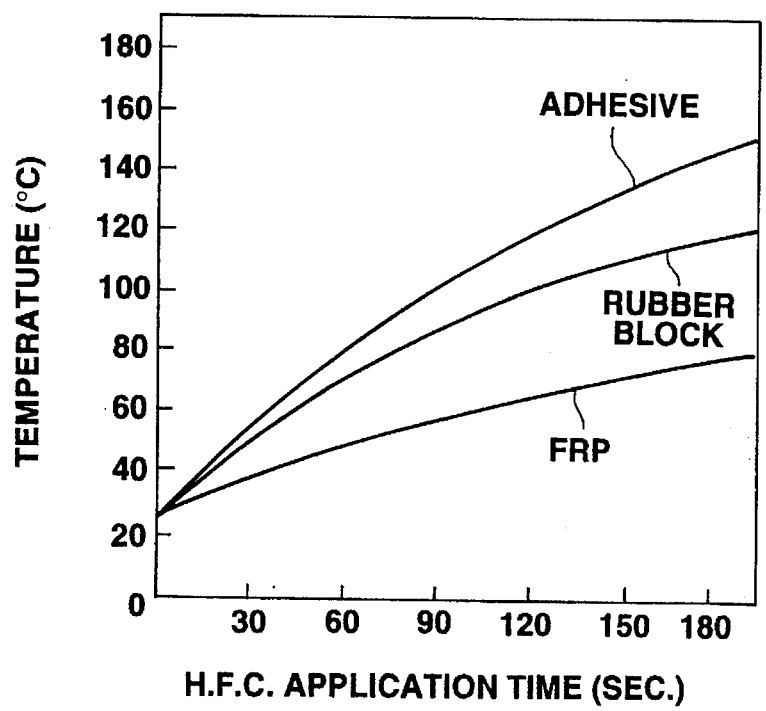
FIG. 8 is a graph showing the temperature rising characteristics of three members which constitutes the example test piece.

The result of the temperature sensing is shown in FIG. 8, and the result of performance tests (viz., visual inspection and peeling test) on the example test piece (E-5) is shown in Table-3.

Figure 9:
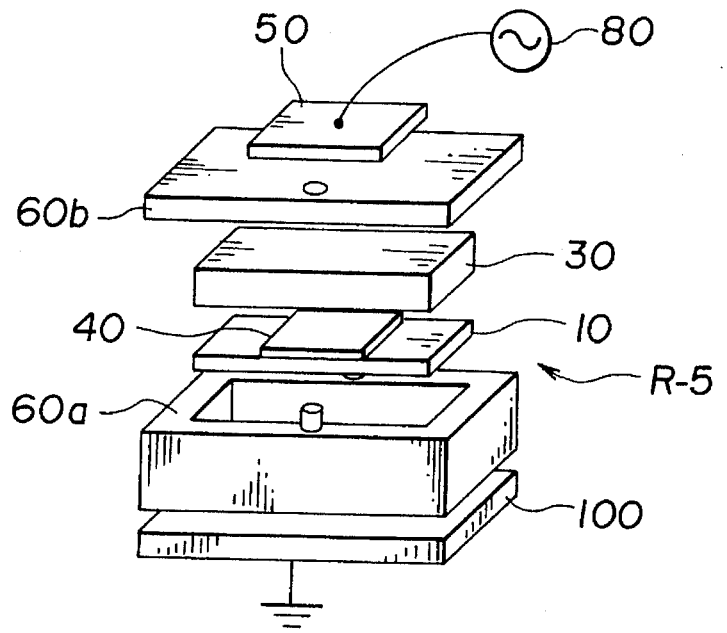
FIG. 9 is a sketch showing in an exploded manner a reference test piece incorporated with the high frequency dielectric heating device.

A similar examination was also carried out on a reference test piece (R-5) which is shown in FIG. 9.

As shown, in the reference test piece (R-5), the arrangement of the two blocks 10 and 30 was opposite to that of the above-mentioned example test piece (E-5) of FIG. 7. That is, in the reference test piece (R-5), the distance from the electrode 50 to the outer surface of the fiber-reinforced plastic block 10 was 8.7 mm and that from the electrode 50 to the outer surface of the rubber block was 3 mm.

Figure 10:
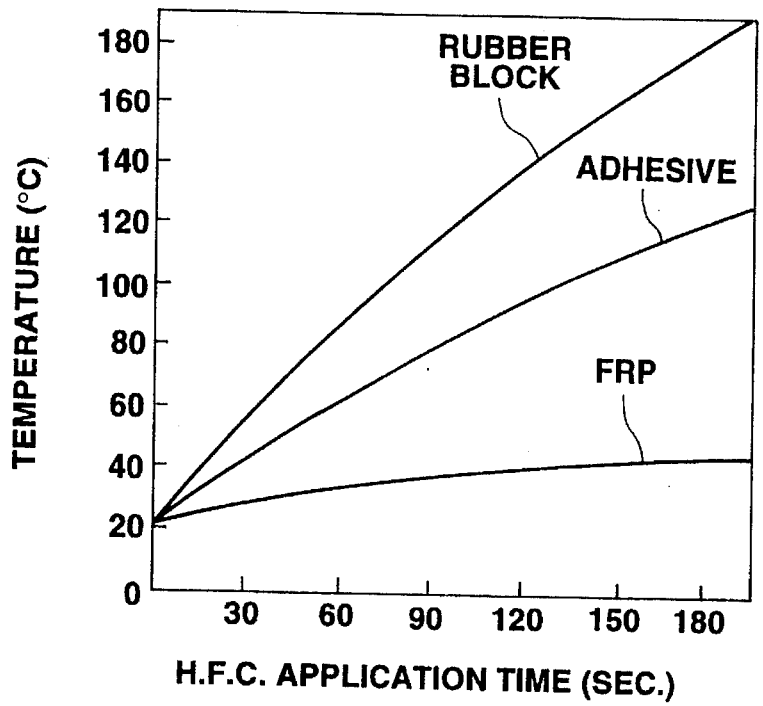
FIG. 10 is a graph showing the temperature rising characteristics of three member which constitute the reference test piece.

The result of the temperature sensing is shown in FIG. 10, and the result of the performance tests (viz., visual inspection and peeling test) on the reference test piece (R-5) is shown in Table-3 (see page 18).

As will be understood when comparing FIGS. 8 and 10, there was a marked difference in temperature rising characteristic between the example test piece (E-5) and the reference test piece (R-5). That is, in the example test piece (E-5), the temperature rising rate of the adhesive 40 was higher than that of the rubber block 30, and the temperature rising rate of the fiber-reinforced plastic block 10 was the lowest. While, in the reference unit (R-5), the temperature rising rate of the rubber block 30 was higher than that of the adhesive 40, and the temperature rising rate of the fiber-reinforced plastic block 10 was the lowest. These results show that the heat produced in the rubber block 30 decreases with increase of the distance from the electrode 50.

As is seen from Table-3, the external appearance of the example test piece (E-5) was not affected by the high frequency dielectric heating. However, in the reference test piece (R-5), the rubber block 30 became somewhat inflated at the time when the high frequency heating time counted 180 seconds. Furthermore, the reference piece (R-5) showed a lower resistance against the peeling.

TABLE 1

|  | E-1 | E-2 | E-3 | E-4 | R-1 | R-2 | R-3 | R-4 |
| --- | --- | --- | --- | --- | --- | --- | --- | --- |
| Contents of Rubber (Parts by Weight) | | | | | | | | |
| NR | 100 | 65 | 65 |  | 100 | 65 | 65 |  |
| BR |  | 35 |  |  |  | 35 |  |  |
| SBR |  |  | 35 |  |  |  | 35 |  |
| EPDM |  |  |  | 100 |  |  |  | 100 |
| Zinc Oxide | 5 | 5 | 5 | 5 | 5 | 5 | 5 | 5 |
| Stearic Acid | 1 | 1 | 1 | 1 | 1 | 1 | 1 | 1 |
| Anti oxidant of quinoline system | 1 | 1 | 1 | 1 | 1 | 1 | 1 | 1 |
| Anti oxidant of Amin system | 3 | 3 | 3 | 3 | 3 | 3 | 3 | 3 |
| Wax of paraffin system | 2 | 2 | 2 | 2 | 2 | 2 | 2 | 2 |
| Carbon black | 40 | 40 | 40 | 40 | 40 | 40 | 40 | 40 |
| Mineral blended oil | 20 | 20 | 20 | 20 | 20 | 20 | 20 | 20 |
| MBTS | 1.5 | 1.5 | 1.5 | 1.5 | 1.5 | 1.5 | 1.5 | 1.5 |
| TMTD | 0.3 | 0.3 | 0.3 | 0.3 | 0.3 | 0.3 | 0.3 | 0.3 |
| Sulfur | 1.5 | 1.5 | 1.5 | 1.5 | 1.5 | 1.5 | 1.5 | 1.5 |
| Total | 175.3 | 175.3 | 175.3 | 175.3 | 175.3 | 175.3 | 175.3 | 175.3 |
| HFC Application Time (sec.) | 20 | 18 | 17 | 25 | — | — | — | — |
| Damage by heating Temperatue (°C.) | NO | NO | NO | NO | — | — | — | — |
| Outer cylindrical member | 72 | 70 | 74 | 70 | — | — | — | — |
| Rubber block | 167 | 167 | 171 | 166 | — | — | — | — |
| Maximum Torque (N · m) | 1120 | 1190 | 1170 | 1190 | 340 | 350 | 350 | 330 |

TABLE 3

|  | E-5 |  | R-5 |  |
| --- | --- | --- | --- | --- |
| HFC Application Time (sec.) | 150 | 180 | 150 | 180 |
| Damage by heating | No | No | No | Inflated |
| Peeling test | | | | |
| Peel strength (N/m) | 1.3 | 1.4 | 1.3 | 1.2 |
| Destruction (%) | R: 70 RC: 30 | R: 90 RC: 10 | R: 60 RC: 40 | R: 85 RC: 15 |

R: Destruction of Rubber block
RC: Separation between Rubber block and Adhesive

What is claimed is:

1. A method of producing a vibration insulator which comprises an outer cylindrical member of fiber-reinforced plastic, an inner cylindrical member of metal, and a compounded rubber block intimately disposed in an annular space between the outer cylindrical member and the inner cylindrical member, said method comprising the steps of:

(a) applying an adhesive having a heat activation temperature to an outer cylindrical surface of said inner cylindrical member and molding about the adhesive-applied inner cylindrical member a compounded rubber block thereby to provide an inner unit;

(b) applying an adhesive having a heat activation temperature to an inner cylindrical surface of said outer cylindrical member thereby to provide an outer unit;

(c) press-fitting said inner unit into said outer unit thereby to constitute a combined unit;

(d) putting an electrode around an outer cylindrical surface of said outer unit;

(e) setting a temperature sensor in said compounded rubber block;

(f) flowing a high frequency current to said electrode to generate a high frequency electric field for selectively heating said compounded rubber block and transmitting heat from said heated compounded rubber block to said adhesive, said high frequency current having a frequency lower than 100 MHz; and (g) stopping the flowing of the high frequency current when said temperature sensor senses a heat activation temperature of the adhesive which was applied to the inner surface of the outer cylindrical member.

2. A method as claimed in claim 1, wherein in step (f) the frequency is controlled such that a part of said rubber block, which is near said electrode plate, is selectively heated and that said part is heated between the activation temperature of the adhesive and the decomposition temperature of said rubber block.

3. A method as claimed in claim 1, further comprising, before the step (d), putting an electrically insulating sheet around the outer cylindrical surface of the outer cylindrical member, so that in step (d) said electrode plate is put around the insulating sheet and around the outer surface of the outer unit.

4. A method as claimed in claim 3, in which the dielectric loss of said electrically insulating sheet is lower than that of said outer cylindrical member of fiber-reinforced plastic.

5. A method as claimed in claim 1, in which said outer cylindrical member is constructed of bisphenol-A epoxy resin and about 60% by volume of carbon fiber.

6. A method as claimed in claim 5, further comprising, before the step (a), applying a primer of chloric system to both the outer cylindrical surface of said inner cylindrical member and the inner cylindrical surface of said outer cylindrical member and drying the primer.

* * * * *